(12) United States Patent
Haydock et al.

(10) Patent No.: US 6,255,043 B1
(45) Date of Patent: Jul. 3, 2001

(54) PHOTOGRAPHIC ELEMENT WITH INVISIBLE INDECIA ON ORIENTED POLYMER BACK SHEET

(75) Inventors: Douglas N. Haydock, Webster; Thaddeus S. Gula, Rochester; Peter T. Aylward, Hilton; Robert P. Bourdelais, Pittsford, all of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/568,074

(22) Filed: May 10, 2000

Related U.S. Application Data

(62) Division of application No. 08/998,163, filed on Dec. 24, 1997.

(51) Int. Cl.[7] .................................................. G03C 1/76
(52) U.S. Cl. ..................... 430/531; 430/533; 430/536; 430/538
(58) Field of Search .................. 430/531, 533, 430/536, 538

(56) References Cited

U.S. PATENT DOCUMENTS

| | | |
|---|---|---|
| 3,930,296 | 1/1976 | Hoover . |
| 4,187,113 | 2/1980 | Mathews et al. . |
| 4,283,486 | 8/1981 | Aono et al. ............................ 430/505 |
| 4,377,616 | 3/1983 | Ashcraft et al. ...................... 428/313 |
| 4,632,869 | 12/1986 | Park et al. ............................. 428/315 |
| 4,758,462 | 7/1988 | Park et al. ............................. 428/213 |
| 4,912,333 | 3/1990 | Roberts et al. ....................... 250/487 |
| 4,994,312 | 2/1991 | Maier et al. .......................... 428/36.5 |
| 5,429,916 | 7/1995 | Ohshima ................................ 430/538 |
| 5,466,519 | 11/1995 | Shirakura et al. .................... 428/323 |
| 5,476,708 | 12/1995 | Reed et al. ............................ 428/211 |
| 5,514,460 | 5/1996 | Surman et al. ................... 428/304.4 |
| 5,853,965 | 12/1998 | Haydock et al. ..................... 430/496 |
| 5,856,266 * | 1/1999 | Gasper et al. ........................ 503/206 |
| 5,874,205 * | 2/1999 | Bourdelais et al. ................. 430/496 |
| 5,879,028 * | 3/1999 | Benoit ..................................... 283/72 |
| 5,888,643 | 3/1999 | Aylward et al. ...................... 428/315 |
| 5,888,681 | 3/1999 | Gula et al. ............................... 430/20 |
| 5,888,683 | 3/1999 | Gula et al. ............................... 430/22 |
| 5,888,714 | 3/1999 | Bourdelais et al. ................. 430/536 |
| 5,919,730 * | 7/1999 | Gasper et al. ........................ 503/201 |
| 6,007,665 * | 12/1999 | Bourdelais et al. ................. 156/277 |
| 6,024,455 * | 2/2000 | O'Neill et al. ....................... 359/530 |
| 6,030,742 * | 2/2000 | Bourdelais et al. ................. 430/201 |
| 6,045,881 * | 4/2000 | Gasper et al. .......................... 428/29 |
| 6,045,894 * | 4/2000 | Jonza et al. .......................... 428/212 |

FOREIGN PATENT DOCUMENTS

| | | |
|---|---|---|
| 0 789 270 | 8/1997 | (EP) . |
| 0 803 377 A1 | 10/1997 | (EP) . |
| 0 880 071 | 11/1998 | (EP) . |
| 1-282552 | 11/1989 | (JP) . |
| WO 91/11750 | 8/1991 | (WO) . |

* cited by examiner

*Primary Examiner*—Janet Baxter
*Assistant Examiner*—Amanda C. Walke
(74) *Attorney, Agent, or Firm*—Paul A. Leipold

(57) ABSTRACT

The invention relates to a photographic element comprising a paper base, at least one photosensitive silver halide layer, and a layer of biaxially oriented polymer sheet adhered to the backside of the said paper base opposite to the side where said at least one said silver halide photosensitive layer is located, wherein said polymer sheet is provided with machine readable indicia on the surface of said sheet between said base paper and said polymer sheet.

18 Claims, No Drawings

PHOTOGRAPHIC ELEMENT WITH INVISIBLE INDECIA ON ORIENTED POLYMER BACK SHEET

This application is a Divisional of U.S. patent application Ser. No. 08/998,163, filed Dec. 24, 1997.

FIELD OF THE INVENTION

This invention relates to imaging materials. It particularly relates to a photographic paper provided with machine readable indicia on the back of the photographic paper.

BACKGROUND OF THE INVENTION

In the formation of color paper it is known that the base paper has applied thereto a layer of polymer, typically polyethylene. This layer serves to provide waterproofing to the paper, as well as providing a smooth surface on which the photosensitive layers are formed. The formation of a suitably smooth surface is difficult requiring great care and expense to ensure proper laydown and cooling of the polyethylene layers. One defect in prior formation techniques is caused when an air bubble is trapped between the forming roller and the polyethylene which will form the surface for casting of photosensitive materials. This air bubble will form a pit that will cause a defect in the photographic performance of photographic materials formed on the polyethylene. It would be desirable if a more reliable and improved surface could be formed at less expense.

In color papers there is a need for providing color papers with improved resistance to curl. Present color papers will curl during development and storage. Such curl is thought to be caused by the different properties of the layers of the color paper as it is subjected to the developing and drying processes. Humidity changes during storage of color photographs lead to curling. There are particular problems with color papers when they are subjected to extended high humidity storage such as at greater than 50% relative humidity. Extremely low humidity of less than 20% relative humidity also will cause photographic papers to curl.

In photographic papers the polyethylene layer also serves as a carrier layer for titanium dioxide and other whitener materials as well as tint materials. It would be desirable if the colorant materials rather than being dispersed throughout the polyethylene layer could be concentrated nearer the surface of the layer where they would be more effective photographically.

It has been proposed in U.S. Pat. No. 5,244,861 to utilize biaxially oriented polypropylene in receiver sheets for thermal dye transfer.

A photographic paper commercially available has a single color printed logo or other brand information printed on the base paper that forms the back of the photographic element. This logo is covered by a layer of polyethylene. The present product is practically limited to a single ink because the present production machines are limited by cost and space limitations to a single color press for printing the indicia onto the back of the base paper.

Other imaging materials also have substrates that are not easily provided with multiple ink printing on the back of the substrate. This includes materials such as thermal dye transfer materials, electrophotographic, and ink jet substrate materials.

During the manufacturing of photographic paper numerous operations require linear measurement of continuous webs for the purposes of minimizing production waste and providing proper customer size product. The current method of measurement is generally a contact method which may be subject to inaccuracy caused by nonuniformity in web conveyance and web surface friction. Physical damage to the web material can also occur through the use of contact measurement devices. Assignment of defective locations within a web is provided using linear measurements. These measurements provide an approximate location for a manual inspection in a separate operation. Large rolls of photographic paper are slit in accordance with customer orders using equipment requiring time consuming operator set up. Locations identified as containing imperfections are removed during the slitting operation.

During the usage of photographic paper, there are several operations which require measurement and alignment of both web and sheet materials. In the printing of web material, it is common for the exposing equipment to create an indexing punch hole between each exposure and also between customer orders. These punch holes are later removed in a chopping operation after photoprocessing has occurred. To advance the web material the proper distance for each exposure a variety of metering rollers and stepper motors are used in conjunction with sensors that detect the punch holes. It is not uncommon for difficulties to arise during the handling and indexing of web materials, such as missed punch holes.

PROBLEM TO BE SOLVED BY THE INVENTION

There is a need for a reliable, low cost, and high quality method of measuring the displacement and cross web locations of web materials, particularly color photographic paper. There is a further need to provide a cleaner environment for imaging equipment, particularly photographic printers in order to reduce the generation of paper dust and other related dirt resulting from the index hole punching operations currently in use. The application of invisible indicia in current manufacturing processes is limited by drying capacity and dimensional change due to the rewetting of the base paper during the application of indicia, therefore restricting the amount of ink that can be applied.

SUMMARY OF THE INVENTION

An object of the invention is to provide a photographic element comprising a paper base, at least one photosensitive silver halide layer, and a layer of biaxially oriented polymer sheet adhered to the backside of the said paper base opposite to the side where said at least one said silver halide photosensitive layer is located, wherein said polymer sheet is provided with invisible indicia on the surface of said sheet between said base paper and said polymer sheet.

ADVANTAGEOUS EFFECT OF THE INVENTION

The invention provides a photographic paper that has a machine readable invisible indicia on the back of the paper. This indicia is provided at low cost and may be applied at high speed to provide a means for more accurate measurement. Such indicia may be used to provide information to slitting and chopping equipment during the manufacturing process.

DETAILED DESCRIPTION OF THE INVENTION

The invention has numerous advantages over prior practice in the art. Currently backside indicia is provided by applying said indicia directly to the base paper prior to the extrusion coating of a melt polymer. The providing of machine readable indicia to the back of photographic paper allows for planar metrology of web and sheet material without contact. "Planar metrology" as used in this application, is defined as point to point measurement of length through the use of predetermined coordinate systems. In a preferred case, rectangular coordinates are used for linear metrology. "Linear Metrology" as used in this application is defined to be the straight line measurement between two points. In web or sheet material applications, both machine and cross machine direction measurements are typically employed. Of particular interest are machine direction measurements. The use of invisible indicia can be applied to linear metrology of high speed webs without surface contact. Said indicia can also be analyzed against time to evaluate and control web speed and linear movement. It further provides the accurate mapping of potentially defective areas of a web, and allows for the precise and rapid locating of such areas for removal. The use of different non-uniformly spaced patterns of indicia can be used to encode a variety of measurements in either the cross web or machine direction. The spacing of indicia must match the capabilities of the equipment that applies and senses the indicia. A practicle range of spacing for either uniform or non-uniform spacing is from 1 mm to 1 m. A preferred range for this invention is from 1 mm to 1 cm. This invention provides the indexing required during photofinishing printing operations and eliminates the need for indexing punch holes.

The application of the invisible indicia on the additional backside sheet also eliminates the need to dry the print on the base paper as the indicia is carried by an additional sheet and, therefore, does not require drying during formation of the photographic sheet.

In formation of photographic color paper with printed indicia on the back of the base paper, there is a problem with the thickness of the paper being consistent in the areas of printing as the fibers swell during printing. The use of the additional biaxially oriented sheet carrying indicia eliminates the problem of inconsistencies of the base paper caused by swelling during printing.

The biaxially oriented sheet utilized in the instant invention generally is printed on the side which will contact the base paper. This printing generally is carried out by Flexographic printing, Rotogravure printing or digital printing. Flexography is an offset letterpress technique where the printing plates are made from rubber or photopolymers. The printing is accomplished by transfer of the ink from the raised surface of the printing plate to the material being printed. The Rotogravure method of printing uses a print cylinder with thousands of tiny cells which are below the surface of the printing cylinder. The ink is transferred from the cells when the print cylinder is brought into contact with the web at the impression roll. The digital method of printing uses a digital computer file of the indicia to be printed. The digital printing method transfers ink from a discrete source to the material being printed. Examples include ink jet printing and thermal dye transfer printing.

Suitable invisible inks for this invention include solvent based inks, water based inks, and radiation cured inks. Such nonvisible inks as they are transparent can be applied to the backside film web without altering the physical appearance of any designs on the web.

For the purpose of clarification, as used in this application "light" is the only type of electromagnetic radiation that is visible to the human eye. Other types of radiation, such as "infrared radiation" are not visible to the human eye because they have different wavelengths than light. "Light" has a wavelength range of 400 nm to 700 nm which makes it visible to the human eye. Infrared radiation has a wavelength range beginning above 700 nm, generally at 800 nm which makes it invisible to the human eye. Similarly, ultraviolet radiation has a wavelength that is less than 400 nm , making it invisible to the human eye. When electromagnetic radiation of the appropriate wavelength range is applied to the printed web, the areas imprinted with invisible indicia will respond by emitting electromagnetic radiation. The wavelength range of the emitted radiation is dependent on the specific characteristics of the dyes used. For example, Kodak I.R. 125 is a laser dye that emits electromagnetic radiation of about 915 nm when exposed to radiation of about 795 nm.

For a particular invisible ink there is a specific wavelength range of absorbtivity and reflectance. The source of illuminance is matched to the absorptivity of the indicia and a detector is matched to its reflectivity.

Examples of solvent based inks include nitrocellulose maleic, nitrocellulose polyamide, nitrocellulose acrylic, nitrocellulose urethane, chlorinated rubber, vinyl, acrylic, alcohol soluble acrylic, cellulose acetate acrylic styrene, and other synthetic polymers. Examples of water based inks include acrylic emulsion, maleic resin dispersion styrene-maleic anhydride resins, and other synthetic polymers. Examples of radiation cured inks include ultraviolet and electron beam inks. The preferred ink systems for printing indicia are water based inks and radiation cured inks because of the need to reduce volatile organic compounds associated with solvent based ink systems.

A substantially transparent magnetic recording layer may also be used to achieve the advantages of this invention. By "substantially transparent" it is meant that the magnetic particles are sufficiently dispersed and are of a size and distribution to permit substantial transmittance, e.g., more than about 63% of visible light through the magnetic recording layer. More specifically, the substantially transparent magnetic recording layer of this invention increases the optical density of the backside biaxially oriented sheet by less than 0.2 optical density units across the visible portion of the spectrum from 400 nm to 700 nm.

The substantially transparent magnetic layer may be used in conjunction with human readable symbology of a plurality of colors. Such human readable symbology may be applied to the backside biaxially oriented sheet by methods well known in the art. The substantially transparent nature of the magnetic recording layer will permit viewing of the human readable symbology.

In forming the transparent magnetic recording layer of this invention, magnetic particles with a surface area of at least 30 $m^2/g$, and preferably with a surface area of at least 40 $m^2/g$ are applied in a layer having a dried thickness of less than 1.5 $\mu$m. The magnetic particles are homogeneously dispersed in a substantially transparent binder and a solvent for the binder. A preferred class of binders are cellulose organic acid esters. The preferred binder is cellulose acetate. Suitable solvents include methylene chloride, methyl alcohol, methyl ethyl ketone, methyl isobutyl ketone, ethyl acetate, butyl acetate, cyclohexanone, butyl alcohol, dimethylformamide and the like as well as mixtures thereof. The dispersing medium can also contain transparent addenda such as plasticizers and dispersing agents.

The biaxially oriented sheet may be applied to the base paper by the use of an adhesive. The adhesive may be any suitable material that will maintain the integrity between the base paper and the biaxially oriented sheet under processing conditions and the condition of use of the photograph and not compromise the integrity of the machine readable or human readable printing on the sheet. Typical of such lamination adhesives are solvent based adhesives such as urethanes, water based adhesives such as acrylics and latex, and 100% solids adhesives such as urethanes. Extruded polyolefins may also be used to apply the biaxially oriented sheet to the base paper. An extruder is used to melt and continuously apply a uniform layer of molten polyolefin directly between the biaxially oriented sheet and the base paper. Bonding is achieved as the molten resin resolidifies in position on the chill roll. Suitable polyolefins for extrusion lamination include polypropylene, polyethylene, polymethylpentene, polystyrene, polybutylene, and mixtures thereof. Polyolefin copolymers, including copolymers of propylene and ethylene such as hexene, butene, and octene are also useful.

A preferred adhesive is polyethylene of low or medium density. The adhesive coating is carried out by extrusion melt coating.

The biaxially oriented sheet carrying invisible indicia generally is transparent or translucent such that the indicia may be detected from the back, but are not subjected to wear. In the alternative the biaxially oriented sheet could be of colored polymer. The colored polymer could be printed on the outer surface prior to or after binding to the photographic element. The placement of indicia on the outer surface would allow formation of specialized photographic base in much smaller quantities as machine detectable indicia of a specific pattern could be added after formation of the photographic paper and even after the development of the paper.

Any suitable biaxially oriented polyolefin sheet may be used for the sheet on the top side of the laminated base of the invention. Microvoided composite biaxially oriented sheets are preferred and are conveniently manufactured by coextrusion of the core and surface layers, followed by biaxial orientation, whereby voids are formed around void-initiating material contained in the core layer. Such composite sheets are disclosed in, for example, U.S. Pat. Nos. 4,377,616; 4,758,462 and 4,632,869, the disclosure of which is incorporated for reference.

The core of the preferred composite sheet should be from 15 to 95% of the total thickness of the sheet, preferably from 30 to 85% of the total thickness. The nonvoided skin(s) should thus be from 5 to 85% of the sheet, preferably from 15 to 70% of the thickness.

The density (specific gravity) of the composite sheet, expressed in terms of "percent of solid density" is calculated as follows:

$$\frac{\text{Composite Sheet Density}}{\text{Polymer Density}} \times 100 = \% \text{ of Solid Density}$$

Percent solid density should be between 45% and 100%, preferably between 67% and 100%. As the percent solid density becomes less than 67%, the composite sheet becomes less manufacturable due to a drop in tensile strength and it becomes more susceptible to physical damage.

The total thickness of the composite sheet can range from 12 to 100 micrometers, preferably from 20 to 70 micrometers. Below 20 micrometers, the microvoided sheets may not be thick enough to minimize any inherent non-planarity in the support and would be more difficult to manufacture. At thicknesses higher than 70 micrometers, little improvement in either surface smoothness or mechanical properties are seen, and so there is little justification for the further increase in cost for extra materials.

The biaxially oriented sheets of the invention preferably have a water vapor permeability that is less than $0.85 \times 10^{-5}$ $g/mm^2/day/atm$. This allows faster emulsion hardening during formation, as the laminated invention support slows the transmission rate of water vapor from the emulsion layers during coating of the emulsions on the support. The transmission rate is measured by ASTM F1249.

"Void" is used herein to mean devoid of added solid and liquid matter, although it is likely the "voids" contain gas. The void-initiating particles which remain in the finished packaging sheet core should be from 0.1 to 10 micrometers in diameter, preferably round in shape, to produce voids of the desired shape and size. The size of the void is also dependent on the degree of orientation in the machine and transverse directions. Ideally, the void would assume a shape which is defined by two opposed and edge contacting concave disks. In other words, the voids tend to have a lens-like or biconvex shape. The voids are oriented so that the two major dimensions are aligned with the machine and transverse directions of the sheet. The Z-direction axis is a minor dimension and is roughly the size of the cross diameter of the voiding particle. The voids generally tend to be closed cells, and thus there is virtually no path open from one side of the voided-core to the other side through which gas or liquid can traverse.

The void-initiating material may be selected from a variety of materials, and should be present in an amount of about 5 to 50% by weight based on the weight of the core matrix polymer. Preferably, the void-initiating material comprises a polymeric material. When a polymeric material is used, it may be a polymer that can be melt-mixed with the polymer from which the core matrix is made and be able to form dispersed spherical particles as the suspension is cooled down. Examples of this would include nylon dispersed in polypropylene, polybutylene terephthalate in polypropylene, or polypropylene dispersed in polyethylene terephthalate. If the polymer is preshaped and blended into the matrix polymer, the important characteristic is the size and shape of the particles. Spheres are preferred and they can be hollow or solid. These spheres may be made from cross-linked polymers which are members selected from the group consisting of an alkenyl aromatic compound having the general formula Ar—C(R)=CH$_2$, wherein Ar represents an aromatic hydrocarbon radical, or an aromatic halohydrocarbon radical of the benzene series and R is hydrogen or the methyl radical; acrylate-type monomers include monomers of the formula CH$_2$=C(R')—C(O)(OR) wherein R is selected from the group consisting of hydrogen and an alkyl radical containing from about 1 to 12 carbon atoms and R' is selected from the group consisting of hydrogen and methyl; copolymers of vinyl chloride and vinylidene chloride, acrylonitrile and vinyl chloride, vinyl bromide, vinyl esters having formula CH$_2$=CH(O)COR, wherein R is an alkyl radical containing from 2 to 18 carbon atoms; acrylic acid, methacrylic acid, itaconic acid, citraconic acid, maleic acid, fumaric acid, oleic acid, vinylbenzoic acid; the synthetic polyester resins which are prepared by reacting terephthalic acid and dialkyl terephthalics or ester-forming derivatives thereof, with a glycol of the series HO(CH$_2$)$_n$OH wherein n is a whole number within the range of 2–10 and having reactive olefinic linkages within the polymer molecule, the above described polyesters which include copolymerized therein up to 20 percent by weight of a second acid or ester thereof having reactive olefinic unsaturation and mixtures thereof, and a cross-linking agent selected from the group consisting of divinylbenzene, diethylene glycol dimethacrylate, diallyl fumarate, diallyl phthalate and mixtures thereof.

Examples of typical monomers for making the crosslinked polymer include styrene, butyl acrylate, acrylamide, acrylonitrile, methyl methacrylate, ethylene glycol dimethacrylate, vinyl pyridine, vinyl acetate, methyl acrylate, vinylbenzyl chloride, vinylidene chloride, acrylic acid, divinylbenzene, acrylamidomethylpropane sulfonic acid, vinyl toluene, etc. Preferably, the cross-linked polymer is polystyrene or poly(methyl methacrylate). Most preferably, it is polystyrene and the cross-linking agent is divinylbenzene.

Processes well known in the art yield non-uniformly sized particles, characterized by broad particle size distributions. The resulting beads can be classified by screening the beads spanning the range of the original distribution of sizes. Other processes such as suspension polymerization, limited coalescence, directly yield very uniformly sized particles.

The void-initiating materials may be coated with agents to facilitate voiding. Suitable agents or lubricants include colloidal silica, colloidal alumina, and metal oxides such as tin oxide and aluminum oxide. The preferred agents are colloidal silica and alumina, most preferably, silica. The cross-linked polymer having a coating of an agent may be prepared by procedures well known in the art. For example, conventional suspension polymerization processes wherein the agent is added to the suspension is preferred. As the agent, colloidal silica is preferred.

The void-initiating particles can also be inorganic spheres, including solid or hollow glass spheres, metal or ceramic beads or inorganic particles such as clay, talc, barium sulfate, calcium carbonate. The important thing is that the material does not chemically react with the core matrix polymer to cause one or more of the following problems: (a) alteration of the crystallization kinetics of the matrix polymer, making it difficult to orient, (b) destruction of the core matrix polymer, (c) destruction of the void-initiating particles, (d) adhesion of the void-initiating particles to the matrix polymer, or (e) generation of undesirable reaction products, such as toxic or high color moieties. The void-initiating material should not be photographically active or degrade the performance of the photographic element in which the biaxially oriented polyolefin sheet is utilized.

For the biaxially oriented sheet on the top side toward the preferred emulsion, suitable classes of thermoplastic polymers for the biaxially oriented sheet and the core matrix-polymer of the preferred composite sheet comprise polyolefins.

Suitable polyolefins include polypropylene, polyethylene, polymethylpentene, polystyrene, polybutylene and mixtures thereof. Polyolefin copolymers, including copolymers of propylene and ethylene such as hexene, butene, and octene are also useful. Polypropylene is preferred, as it is low in cost and has desirable strength properties.

The nonvoided skin layers of the composite sheet can be made of the same polymeric materials as listed above for the core matrix. The composite sheet can be made with skin(s) of the same polymeric material as the core matrix, or it can be made with skin(s) of different polymeric composition than the core matrix. For compatibility, an auxiliary layer can be used to promote adhesion of the skin layer to the core.

Addenda may be added to the core matrix and/or to the skins to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet. For photographic use, a white base with a slight bluish tint is preferred.

The coextrusion, quenching, orienting, and heat setting of these composite sheets may be effected by any process which is known in the art for producing oriented sheet, such as by a flat sheet process or a bubble or tubular process. The flat sheet process involves extruding the blend through a slit die and rapidly quenching the extruded web upon a chilled casting drum so that the core matrix polymer component of the sheet and the skin components(s) are quenched below their glass solidification temperature. The quenched sheet is then biaxially oriented by stretching in mutually perpendicular directions at a temperature above the glass transition temperature, below the melting temperature of the matrix polymers. The sheet may be stretched in one direction and then in a second direction or may be simultaneously stretched in both directions. After the sheet has been stretched, it is heat set by heating to a temperature sufficient to crystallize or anneal the polymers while restraining to some degree the sheet against retraction in both directions of stretching.

The composite sheet, while described as having preferably at least three layers of a microvoided core and a skin layer on each side, may also be provided with additional layers that may serve to change the properties of the biaxially oriented sheet. A different effect may be achieved by additional layers. Such layers might contain tints, antistatic materials, or different void-making materials to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

These composite sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

By having at least one nonvoided skin on the microvoided core, the tensile strength of the sheet is increased and makes it more manufacturable. It allows the sheets to be made at wider widths and higher draw ratios than when sheets are made with all layers voided. Coextruding the layers further simplifies the manufacturing process.

The structure of a typical biaxially oriented, microvoided sheet of the invention is as follows:

solid skin layer microvoided core layer solid skin layer

The sheet on the side of the base paper opposite to the imaging side may be any suitable sheet. The sheet may or may not be microvoided. It may have the same composition as the sheet on the top side of the paper backing material.

Biaxially oriented sheets are conveniently manufactured by coextrusion of the sheet, which may contain several layers, followed by biaxial orientation. Such biaxially oriented sheets are disclosed in, for example, U.S. Pat. No. 4,764,425.

The preferred biaxially oriented sheet is a biaxially oriented polyolefin sheet, most preferably a sheet of polyethylene or polypropylene. The thickness of the biaxially oriented sheet should be from 10 to 150 micrometers. Below 15 micrometers, the sheets may not be thick enough to minimize any inherent non-planarity in the support and would be more difficult to manufacture. At thicknesses higher than 70 micrometers, little improvement in either surface smoothness or mechanical properties are seen, and so there is little justification for the further increase in cost for extra materials.

Suitable classes of thermoplastic polymers for the biaxially oriented sheet include polyolefins, polyesters, polyamides, polycarbonates, cellulosic esters, polystyrene, polyvinyl resins, polysulfonamides, polyethers, polyimides, polyvinylidene fluoride, polyurethanes, polyphenylenesulfides, polytetrafluoroethylene, polyacetals, polysulfonates, polyester ionomers, and polyolefin ionomers. Copolymers and/or mixtures of these polymers can be used.

Suitable polyolefins include polypropylene, polyethylene, polymethylpentene, and mixtures thereof. Polyolefin copolymers, including copolymers of propylene and ethylene such as hexene, butene and octene are also useful. Polypropylenes are preferred because they are low in cost and have good strength and surface properties.

Suitable polyesters include those produced from aromatic, aliphatic or cycloaliphatic dicarboxylic acids of 4–20 carbon atoms and aliphatic or alicyclic glycols having from 2–24 carbon atoms. Examples of suitable dicarboxylic acids include terephthalic, isophthalic, phthalic, naphthalene dicarboxylic acid, succinic, glutaric, adipic, azelaic, sebacic, fumaric, maleic, itaconic, 1,4-cyclohexanedicarboxylic, sodiosulfoisophthalic and mixtures thereof. Examples of suitable glycols include ethylene glycol, propylene glycol, butanediol, pentanediol, hexanediol, 1,4-cyclohexanedimethanol, diethylene glycol, other polyethylene glycols and mixtures thereof. Such polyesters are well known in the art and may be produced by well known techniques, e.g., those described in U.S. Pat. No. 2,465,319 and U.S. Pat. No. 2,901,466. Preferred continuous matrix polyesters are those having repeat units from terephthalic acid or naphthalene dicarboxylic acid and at least one glycol selected from ethylene glycol, 1,4-butanediol and 1,4-cyclohexanedimethanol. Poly(ethylene terephthalate), which may be modified by small amounts of other monomers, is especially preferred. Other suitable polyesters include liquid crystal copolyesters formed by the inclusion of suitable amount of a co-acid component such as stilbene dicarboxylic acid. Examples of such liquid crystal copolyesters are those disclosed in U.S. Pat. Nos. 4,420,607, 4,459,402 and 4,468,510.

Useful polyamides include nylon 6, nylon 66, and mixtures thereof. Copolymers of polyamides are also suitable continuous phase polymers. An example of a useful polycarbonate is bisphenol-A polycarbonate. Cellulosic esters suitable for use as the continuous phase polymer of the composite sheets include cellulose nitrate, cellulose triacetate, cellulose diacetate, cellulose acetate propionate, cellulose acetate butyrate, and mixtures or copolymers thereof. Useful polyvinyl resins include polyvinyl chloride, poly(vinyl acetal), and mixtures thereof. Copolymers of vinyl resins can also be utilized.

The biaxially oriented sheet on the backside of the laminated base can be made with layers of the same polymeric material, or it can be made with layers of different polymeric composition. For compatibility, an auxiliary layer can be used to promote adhesion of multiple layers.

Although it is preferred that the back sheet be transparent for viewing of printed indicia through the back sheet, addenda may be added to the biaxially oriented sheet to improve the whiteness of these sheets. This would include any process which is known in the art including adding a white pigment, such as titanium dioxide, barium sulfate, clay, or calcium carbonate. This would also include adding fluorescing agents which absorb energy in the UV region and emit light largely in the blue region, or other additives which would improve the physical properties of the sheet or the manufacturability of the sheet. Colorants may also be added to the back sheet.

The coextrusion, quenching, orienting, and heat setting of these biaxially oriented sheets may be effected by any process which is known in the art for producing oriented sheet, such as by a flat sheet process or a bubble or tubular process. The flat sheet process involves extruding or coextruding the blend through a slit die and rapidly quenching the extruded or coextruded web upon a chilled casting drum so that the polymer component(s) of the sheet are quenched below their solidification temperature. The quenched sheet is then biaxially oriented by stretching in mutually perpendicular directions at a temperature above the glass transition temperature of the polymer(s). The sheet may be stretched in one direction and then in a second direction or may be simultaneously stretched in both directions. After the sheet has been stretched, it is heat set by heating to a temperature sufficient to crystallize the polymers while restraining to some degree the sheet against retraction in both directions of stretching.

The biaxially oriented sheet on the backside of the laminated base, while described as having preferably at least one layer, may also be provided with additional layers that may serve to change the properties of the biaxially oriented sheet. A different effect may be achieved by additional layers. Such layers might contain tints, antistatic materials, or slip agents to produce sheets of unique properties. Biaxially oriented sheets could be formed with surface layers that would provide an improved adhesion, or look to the support and photographic element. The biaxially oriented extrusion could be carried out with as many as 10 layers if desired to achieve some particular desired property.

The invisible indicia applied to the biaxially oriented sheet on the backside of the laminated base is preferably located adjacent to the bonding layer used to attach the backside sheet to the base paper. In applications where the backside biaxially oriented sheet consists of material that inhibits or alters the machine reability of the invisible indicia, the invisible indicia may be located on the side of the backside biaxially oriented sheet that is opposite the bonding layer.

These biaxially oriented sheets may be coated or treated after the coextrusion and orienting process or between casting and full orientation with any number of coatings which may be used to improve the properties of the sheets including printability, to provide a vapor barrier, to make them heat sealable, or to improve the adhesion to the support or to the photo sensitive layers. Examples of this would be acrylic coatings for printability, coating polyvinylidene chloride for heat seal properties. Further examples include flame, plasma or corona discharge treatment to improve printability or adhesion.

The structure of a typical biaxially oriented sheet of the invention is as follows:
treated skin layer
solid core layer The support to which the microvoided composite sheets and biaxially oriented sheets are laminated for the laminated imaging support or for the formation of photosensitive silver halide layer may be a polymeric, a synthetic paper, cloth, woven polymer fibers, or the preferred cellulose fiber paper support, or laminates thereof. The base also may be a microvoided polyethylene terephalate such as disclosed in U.S. Pat. Nos. 4,912,333; 4,994,312 and 5,055,371, the disclosure of which is incorporated for reference. The preferred support is a photographic grade cellulose fiber paper.

During the lamination process, it is desirable to maintain control of the tension of the biaxially oriented sheet(s) in order to minimize curl in the resulting laminated support. For high humidity applications (>50% RH) and low humidity applications (<20% RH), it is desirable to laminate both a front side and backside film to keep curl to a minimum.

In one preferred embodiment, in order to produce laminated base with a desirable photographic look and feel, it is preferable to use relatively thick paper supports (e.g., at least 120 μm thick, preferably from 120 to 250 μm thick) and relatively thin microvoided composite sheets (e.g., less than 50 μm thick, preferably from 20 to 50 μm thick, more preferably from 30 to 50 μm thick).

The photographic elements can be single color elements or multicolor elements. Multicolor elements contain image dye-forming units sensitive to each of the three primary regions of the spectrum. Each unit can comprise a single emulsion layer or multiple emulsion layers sensitive to a given region of the spectrum. The layers of the element, including the layers of the image-forming units, can be arranged in various orders as known in the art. In an alternative format, the emulsions sensitive to each of the three primary regions of the spectrum can be disposed as a single segmented layer.

The photographic emulsions useful for this invention are generally prepared by precipitating silver halide crystals in a colloidal matrix by methods conventional in the art. The colloid is typically a hydrophilic film forming agent such as gelatin, alginic acid, or derivatives thereof.

The crystals formed in the precipitation step are washed and then chemically and spectrally sensitized by adding spectral sensitizing dyes and chemical sensitizers, and by providing a heating step during which the emulsion temperature is raised, typically from 40° C. to 70° C., and maintained for a period of time. The precipitation and spectral and chemical sensitization methods utilized in preparing the emulsions employed in the invention can be those methods known in the art.

Chemical sensitization of the emulsion typically employs sensitizers such as: sulfur-containing compounds, e.g., allyl isothiocyanate, sodium thiosulfate and allyl thiourea; reducing agents, e.g., polyamines and stannous salts; noble metal compounds, e.g., gold, platinum; and polymeric agents, e.g., polyalkylene oxides. As described, heat treatment is employed to complete chemical sensitization. Spectral sensitization is effected with a combination of dyes, which are designed for the wavelength range of interest within the visible or infrared spectrum. It is known to add such dyes both before and after heat treatment.

After spectral sensitization, the emulsion is coated on a support. Various coating techniques include dip coating, air knife coating, curtain coating and extrusion coating.

The silver halide emulsions utilized in this invention may be comprised of any halide distribution. Thus, they may be comprised of silver chloride, silver chloroiodide, silver bromide, silver bromochloride, silver chlorobromide, silver iodochloride, silver iodobromide, silver bromoiodochloride, silver chloroiodobromide, silver iodobromochloride, and silver iodochlorobromide emulsions. It is preferred, however, that the emulsions be predominantly silver chloride emulsions. By predominantly silver chloride, it is meant that the grains of the emulsion are greater than about 50 mole percent silver chloride. Preferably, they are greater than about 90 mole percent silver chloride; and optimally greater than about 95 mole percent silver chloride.

The silver halide emulsions can contain grains of any size and morphology. Thus, the grains may take the form of cubes, octahedrons, cubo-octahedrons, or any of the other naturally occurring morphologies of cubic lattice type silver halide grains. Further, the grains may be irregular such as spherical grains or tabular grains. Grains having a tabular or cubic morphology are preferred.

The photographic elements of the invention may utilize emulsions as described in *The Theory of the Photographic Process*, Fourth Edition, T. H. James, Macmillan Publishing Company, Inc., 1977, pages 151–152. Reduction sensitization has been known to improve the photographic sensitivity of silver halide emulsions. While reduction sensitized silver halide emulsions generally exhibit good photographic speed, they often suffer from undesirable fog and poor storage stability.

Reduction sensitization can be performed intentionally by adding reduction sensitizers, chemicals which reduce silver ions to form metallic silver atoms, or by providing a reducing environment such as high pH (excess hydroxide ion) and/or low pAg (excess silver ion). During precipitation of a silver halide emulsion, unintentional reduction sensitization can occur when, for example, silver nitrate or alkali solutions are added rapidly or with poor mixing to form emulsion grains. Also, precipitation of silver halide emulsions in the presence of ripeners (grain growth modifiers) such as thioethers, selenoethers, thioureas, or ammonia tends to facilitate reduction sensitization.

Examples of reduction sensitizers and environments which may be used during precipitation or spectral/chemical sensitization to reduction sensitize an emulsion include ascorbic acid derivatives; tin compounds; polyamine compounds; and thiourea dioxide-based compounds described in U.S. Pat. Nos. 2,487,850; 2,512,925; and British Patent 789,823. Specific examples of reduction sensitizers or conditions, such as dimethylamineborane, stannous chloride, hydrazine, high pH (pH 8–11) and low pAg (pAg 1–7) ripening are discussed by S. Collier in Photographic Science and Engineering, 23,113 (1979). Examples of processes for preparing intentionally reduction sensitized silver halide emulsions are described in EP 0 348934 A1 (Yamashita), EP 0 369491 (Yamashita), EP 0 371388 (Ohashi), EP 0 396424 A1 (Takada), EP 0 404142 Al (Yamada), and EP 0 435355 A1 (Makino).

The photographic elements of this invention may use emulsions doped with Group VIII metals such as iridium, rhodium, osmium, and iron as described in *Research Disclosure*, September 1994, Item 36544, Section I, published by Kenneth Mason Publications, Ltd., Dudley Annex, 12a North Street, Emsworth, Hampshire P010 7DQ, ENGLAND. Additionally, a general summary of the use of iridium in the sensitization of silver halide emulsions is contained in Carroll, "Iridium Sensitization: A Literature Review," Photographic Science and Engineering, Vol. 24, No. 6, 1980. A method of manufacturing a silver halide emulsion by chemically sensitizing the emulsion in the presence of an iridium salt and a photographic spectral sensitizing dye is described in U.S. Pat. No. 4,693,965. In some cases, when such dopants are incorporated, emulsions show an increased fresh fog and a lower contrast sensitometric curve when processed in the color reversal E-6 process as described in The British Journal of Photography Annual, 1982, pages 201–203.

A typical multicolor photographic element of the invention comprises the invention laminated support bearing a cyan dye image-forming unit comprising at least one red-sensitive silver halide emulsion layer having associated therewith at least one cyan dye-forming coupler; a magenta image-forming unit comprising at least one green-sensitive silver halide emulsion layer having associated therewith at least one magenta dye-forming coupler; and a yellow dye image-forming unit comprising at least one blue-sensitive silver halide emulsion layer having associated therewith at least one yellow dye-forming coupler. The element may contain additional layers, such as filter layers, interlayers, overcoat layers, subbing layers, and the like. The support of the invention may also be utilized for black and white photographic print elements.

The photographic elements may also contain a transparent magnetic recording layer such as a layer containing magnetic particles on the underside of a transparent support, as in U.S. Pat. Nos. 4,279,945 and 4,302,523. Typically, the element will have a total thickness (excluding the support) of from about 5 to about 30 micrometers.

In the following Table, reference will be made to (1) *Research Disclosure,* December 1978, Item 17643, (2) *Research Disclosure,* December 1989, Item 308119, and (3) *Research Disclosure,* September 1996, Item 38957, all published by Kenneth Mason Publications, Ltd., Dudley Annex, 12a North Street, Emsworth, Hampshire PO10 7DQ, ENGLAND. The Table and the references cited in the Table are to be read as describing particular components suitable for use in the elements of the invention. The Table and its cited references also describe suitable ways of preparing, exposing, processing and manipulating the elements, and the images contained therein.

| Reference | Section | Subject Matter |
| --- | --- | --- |
| 1 | I, II | Grain composition, morphology and preparation. Emulsion preparation including hardeners, coating aids, addenda, etc. |
| 2 | I, II, IX, X, XI, XII, XIV, XV | |
| | I, II, III, IX | |
| 3 | A & B | |
| 1 | III, IV | Chemical sensitization and spectral sensitization/ desensitization |
| 2 | III, IV | |
| 3 | IV, V | |
| 1 | V | UV dyes, optical brighteners, luminescent dyes |
| 2 | V | |
| 3 | VI | |
| 1 | VI | Antifoggants and stabilizers |
| 2 | VI | |
| 3 | VII | |
| 1 | VIII | Absorbing and scattering materials; Antistatic layers; matting agents |
| 2 | VIII, XIII, XVI | |
| 3 | VIII, IX C & D | |
| 1 | VII | Image-couplers and image-modifying couplers; Dye stabilizers and hue modifiers |
| 2 | VII | |
| 3 | X | |
| 1 | XVII | Supports |
| 2 | XVII | |
| 3 | XV | |

-continued

| Reference | Section | Subject Matter |
| --- | --- | --- |
| 3 | XI | Specific layer arrangements |
| 3 | XII, XIII | Negative working emulsions; Direct positive emulsions |
| 2 | XVIII | Exposure |
| 3 | XVI | |
| 1 | XIX, XX | Chemical processing; Developing agents |
| 2 | XIX, XX, XXII | |
| 3 | XVIII, XIX, XX | |
| 3 | XIV | Scanning and digital processing procedures |

The photographic elements can be exposed with various forms of energy which encompass the ultraviolet, visible, and infrared regions of the electromagnetic spectrum as well as with electron beam, beta radiation, gamma radiation, x-ray, alpha particle, neutron radiation, and other forms of corpuscular and wave-like radiant energy in either noncoherent (random phase) forms or coherent (in phase) forms, as produced by lasers. When the photographic elements are intended to be exposed by x-rays, they can include features found in conventional radiographic elements.

The photographic elements are preferably exposed to actinic radiation, typically in the visible region of the spectrum, to form a latent image, and then processed to form a visible image, preferably by other than heat treatment. Processing is preferably carried out in the known RA-4™ (Eastman Kodak Company) Process or other processing systems suitable for developing high chloride emulsions.

While primarily described for use as a photographic laminated base, the base may also be used for the forming of other images. These include those used for ink jet, thermal transfer, and electrophotographic imaging.

The laminated substrate of the invention may have copy restriction features incorporated such as disclosed in U.S. patent application Ser. No. 08/598,785 filed Feb. 8, 1996 and application Ser. No. 08/598,778 filed on the same day. These applications disclose rendering a document copy restrictive by embedding into the document a pattern of invisible microdots. These microdots are, however, detectable by the electro-optical scanning device of a digital document copier. The pattern of microdots may be incorporated throughout the document. Such documents may also have colored edges or an invisible microdot pattern on the backside to enable users or machines to read and identify the media. The media may take the form of sheets that are capable of bearing an image. Typical of such materials are photographic paper and film materials composed of polyethylene resin coated paper, polyester, (poly)ethylene naphthalate, and cellulose triacetate based materials.

The microdots can take any regular or irregular shape with a size smaller than the maximum size at which individual microdots are perceived sufficiently to decrease the usefulness of the image, and the minimum level is defined by the detection level of the scanning device. The microdots may be distributed in a regular or irregular array with center-to-center spacing controlled to avoid increases in document density. The microdots can be of any hue, brightness, and saturation that does not lead to sufficient detection by casual observation, but preferably of a hue least resolvable by the human eye, yet suitable to conform to the sensitivities of the document scanning device for optimal detection.

In one embodiment the information-bearing document is comprised of a support, an image-forming layer coated on the support and pattern of microdots positioned between the support and the image-forming layer to provide a copy restrictive medium. Incorporation of the microdot pattern into the document medium can be achieved by various printing technologies either before or after production of the original document. The microdots can be composed of any colored substance, although depending on the nature of the document, the colorants may be translucent, transparent, or opaque. It is preferred to locate the microdot pattern on the support layer prior to application of the protective layer, unless the protective layer contains light scattering pigments. Then the microdots should be located above such layers and preferably coated with a protective layer. The microdots can be composed of colorants chosen from image dyes and filter dyes known in the photographic art and dispersed in a binder or carrier used for printing inks or light-sensitive media.

In a preferred embodiment the creation of the microdot pattern as a latent image is possible through appropriate temporal, spatial, and spectral exposure of the photosensitive materials to visible or non-visible wavelengths of electromagnetic radiation. The latent image microdot pattern can be rendered detectable by employing standard photographic chemical processing. The microdots are particularly useful for both color and black-and-white image-forming photographic media. Such photographic media will contain at least one silver halide radiation sensitive layer, although typically such photographic media contain at least three silver halide radiation sensitive layers. It is also possible that such media contain more than one layer sensitive to the same region of radiation. The arrangement of the layers may take any of the forms known to one skilled in the art, as discussed in *Research Disclosure* 37038 of February 1995.

The examples below illustrate the practice of this invention. They are not intended to be exhaustive of all possible variations of the invention. Parts and percentages are by weight unless otherwise indicated. Examples 1–5 are general examples of laminated base materials. The higher number examples better illustrate the invention as herein claimed.

Commercial Grade Paper of Examples

A photographic paper support was produced by refining a pulp furnish of 50% bleached hardwood kraft, 25% bleached hardwood sulfite, and 25% bleached softwood sulfite through a double disk refiner, then a Jordan conical refiner to a Canadian Standard Freeness of 200 cc. To the resulting pulp furnish was added 0.2% alkyl ketene dimer, 1.0% cationic cornstarch, 0.5% polyamide-epichlorohydrin, 0.26 anionic polyacrylamide, and 5.0% $TiO_2$ on a dry weight basis. An about 46.5 lbs. per 1000 sq. ft. (ksf) bone dry weight base paper was made on a fourdrinier paper machine, wet pressed to a solid of 42%, and dried to a moisture of 10% using steam-heated dryers achieving a Sheffield Porosity of 160 Sheffield Units and an apparent density 0.70 g/cc. The paper base was then surface sized using a vertical size press with a 10% hydroxyethylated cornstarch solution to achieve a loading of 3.3 wt. % starch. The surface sized support was calendered to an apparent density of 1.04 gm/cc.

EXAMPLES

Example 1

The following laminated photographic base was prepared by extrusion laminating the following sheet to both sides of photographic grade cellulose paper support:

BICOR 70 MLT (Mobil Chemical Company)

A one-side matte finish, one-side corona treated polypropylene sheet (18 mm thick) (d=0.9 $g/cm^3$) consisting of a solid oriented polypropylene core. The treated side of the backside sheet has been imprinted with an infrared reflective pattern in a single pass using solvent-based inks on a multiple station Flexographic printer. The printed pattern comprises a series of machine direction and cross-machine direction lines spaced at 1 centimeter intervals.

Both the Top and Backside sheets were extrusion laminated to a photographic grade cellulose paper support with a clear polyethylene (25 $g/m^3$). The printed side was laminated so as to be adjacent the paper on the bottom. The top sheet was laminated with the treated side exposed.

This laminated support is then emulsion coated and with a color photosensitive layer. Using web conveyance equipment, infrared sensors, and a desktop computer running a data collection program, the emulsion coated laminate is conveyed to demonstrate footage measurement. In an additional test, web movement control is demonstrated in advance tests ranging from 1 centimeter to 2000 meters. The tests are repeated after the emulsion was exposed and processed.

This example demonstrates the ability to laminate a biaxially-oriented polypropylene film that consists of invisible machine detectable indicia of a repeating grid pattern on a photographic paper base, and to use said invisible indicia to measure and control web movement with no distortion or degradation to the quality of the printed graphics.

The invention has been described in detail with particular reference to preferred embodiments thereof, but it will be understood that variations and modifications can be effected within the spirit and scope of the invention.

What is claimed is:

1. A method of linear metrology for continuous web or sheet elements comprising providing a preformed biaxially oriented polyolefin sheet, providing a base paper, applying a bonding agent onto the top of said base paper and simultaneously applying said biaxially oriented sheet to said bonding agent to join said microvoided sheet to the top of said base paper, providing a back sheet of biaxially oriented polymer sheet bearing indicia wherein said indicia are machine readable and not visible to the human eye under natural or artificial daylight illuminance, laminating said back sheet to the back of said base paper with bonding agent such that the indicia are adjacent said base paper, providing a means to detect said machine readable indicia, providing a means to collect information about the detection of said machine readable indicia, and providing a means to store and process the said collected information and wherein the machine readable indicia is a substantially transparent magnetic recording layer containing magnetic particles in a binder said magnetic particles have a specific surface area of at least 30 $g/m^2$, said magnetic recording layer having a dried thickness of less than about 1.5 $\mu$m and increases the optical density of the photographic element by less than 0.2 optical density units across the visible portion of the spectrum from 4000 Å to 7000 Å.

2. A method of claim 1 further comprising human readable symbology in at least two colors.

3. The method of claim 1 further comprising an image receiving layer.

4. The method of claim 1 further comprising at least one photosensitive silver-halide layer.

5. The method of claim 1 where in the machine readable indicia is applied in a uniform grid pattern.

6. The method of claim 1 where in the machine-readable indicia is applied in a non-uniform grid pattern.

7. A method of linear metrology for continuous web or sheet elements comprising providing a preformed biaxially oriented polyolefin sheet, providing a base paper, applying a bonding agent onto the top of said base paper and simultaneously applying said biaxially oriented sheet to said bonding agent to join said microvoided sheet to the top of said base paper, providing a white or colored back sheet of biaxially oriented polymer sheet bearing indicia wherein said indicia are machine readable, laminating said back sheet to the back of said base paper with bonding agent such that the indicia are on the lower side, providing a means to detect said machine readable indicia, providing a means to collect information about the detection of said machine readable indicia, and providing a means to store and process the said collected information wherein said machine readable indicia comprise inks which respond to actinic radiation below 4000 Å or above 7000 Å.

8. The method of claim 7 further comprising an image receiving layer.

9. The method of claim 7 further comprising at least one photosensitive silver-halide layer.

10. The method of claim 7 where in the machine readable indicia is applied in a uniform grid pattern.

11. The method of claim 7 where in the machine-readable indicia is applied in a non-uniform grid pattern.

12. A method of claim 7 further comprising human readable symbology in at least two colors.

13. A method of linear metrology for continuous web or sheet elements comprising providing a preformed biaxially oriented polyolefin sheet, providing a base paper, applying a bonding agent onto the top of said base paper and simultaneously applying said biaxially oriented sheet to said bonding agent to join said microvoided sheet to the top of said base paper, providing a back sheet of biaxially oriented polymer sheet bearing indicia wherein said indicia are machine readable and not visible to the human eye under natural or artificial daylight illuminance, laminating said back sheet to the back of said base paper with bonding agent such that the indicia are adjacent said base paper, providing a means to detect said machine readable indicia, providing a means to collect information about the detection of said machine readable indicia, and providing a means to store and process the said collected information wherein said machine readable indicia comprise inks which respond to actinic radiation below 4000Å or about 7000 Å.

14. The method of claim 13 further comprising an image receiving layer.

15. The method of claim 13 further comprising at least one photosensitive silver-halide layer.

16. The method of claim 13 where in the machine readable indicia is applied in a uniform grid pattern.

17. The method of claim 13 where in the machine-readable indicia is applied in a non-uniform grid pattern.

18. A method of claim 13 further comprising human readable symbology in at least two colors.

* * * * *